(No Model.)
J. W. MARSH.
HOLDER FOR ELECTRIC CABLES.
No. 450,589. Patented Apr. 14, 1891.
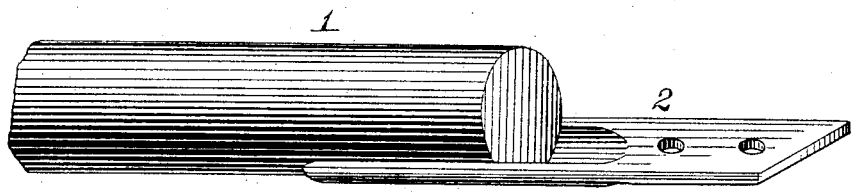
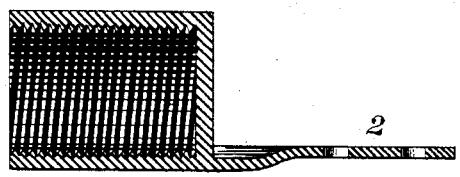
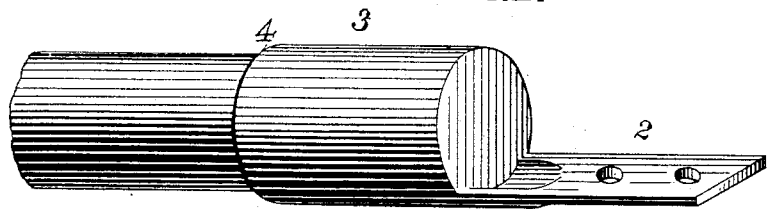
WITNESSES:
INVENTOR.

UNITED STATES PATENT OFFICE.

JOSEPH W. MARSH, OF PITTSBURG, PENNSYLVANIA, ASSIGNOR TO THE STANDARD UNDERGROUND CABLE COMPANY, OF SAME PLACE.

HOLDER FOR ELECTRIC CABLES.

SPECIFICATION forming part of Letters Patent No. 450,589, dated April 14, 1891.

Application filed September 12, 1890. Serial No. 364,732. (No model.)

*To all whom it may concern:*

Be it known that I, JOSEPH W. MARSH, a citizen of the United States, residing at Pittsburg, in the county of Allegheny and State of Pennsylvania, have invented or discovered certain new and useful Improvements in Holders for Cables, of which improvements the following is a specification.

The invention described herein relates to certain improvements in devices for securing electric cables upon the spools or reels upon which they are wound for shipment or storage and protecting the ends of such cables from the entrance of moisture and from injury.

In general terms the invention consists in the construction and combination of mechanical devices or elements, all as more fully hereinafter described and claimed.

In the accompanying drawings, forming a part of this specification, Figure 1 is a view in elevation of the end of a cable having my improvement applied thereto. Fig. 2 is a similar view showing a modification of the holder, and Fig. 3 is a sectional view of a further modification.

In winding cables on spools it is customary to bore a hole through the side or flange of the spool near the spindle and then pass one end of the cable through such hole. The projecting end is soldered over and then fastened against the flange by metal straps. After the cable has been wound upon the spool the other end thereof is secured in a like manner. This manner of securing the cable is objectionable, not only on account of the labor and time required and the loss of portions of the cable at each end, it being necessary to cut off the parts bent for insertion through the flange of the spool, but also on account of the liability, through careless soldering of the ends, of the entrance of moisture, which will penetrate many feet into the cable, thereby rendering such portions useless.

In the practice of my invention in its simplest form the ends of the cable 1 are soldered over, as shown in Fig. 1, and then to such ends I secure by soldering the metallic clip 2, preferably formed of lead, tin, or some suitable flexible material. This clip projects a suitable distance beyond the ends of the cable, and said ends are fastened, one to the hub or flange near the hub and the other to the flange of the spool, after winding the cable, by nails or screws passing through the projecting ends of the clip. It is preferred, however, to form or attach the clip 2 in a socket 3, which is made of size to fit easily over the ends of the cable, as shown in Fig. 2. In using this device it is only necessary to solder the edge of the socket to the lead covering of the cable, as indicated at 4, Fig. 2, thereby at one operation sealing the end of cable, as against access of moisture and securing the clip to the cable.

As it is customary to test the cable after it has been wound upon the reel, it is necessary in applying the holder to prevent the wires of the cable from coming in contact with the socket or holder. This result may be effected by so constructing the holder or socket that its closed end will not fit down upon the end of the cable.

If desired, the socket may be made of malleable iron or steel and internally threaded, as shown in Fig. 3, so that it may be screwed onto the cable, thereby avoiding the necessity of soldering.

I claim herein as my invention—

1. The combination, with a cable, of clips secured to the ends of the cable and adapted to be attached to the spool for the transportation of the cable, substantially as set forth.

2. The combination, with a cable, of a socket fitting over the ends of the cable, and a clip for attaching the ends of the cable to the spool, substantially as set forth.

In testimony whereof I have hereunto set my hand.

JOSEPH W. MARSH.

Witnesses:
W. S. THOMAS,
DARWIN S. WOLCOTT.